United States Patent [19]
Houlihan

[11] Patent Number: 4,819,217
[45] Date of Patent: Apr. 4, 1989

[54] BICYCLE HANDLEBAR HOLDER FOR A WRIST INSTRUMENT

[75] Inventor: John T. Houlihan, Watertown, Conn.
[73] Assignee: Timex Corporation, Middlebury, Conn.
[21] Appl. No.: 239,866
[22] Filed: Sep. 2, 1988
[51] Int. Cl.$^4$ .......................... G04B 47/00; B62J 7/00
[52] U.S. Cl. ..................................... 368/10; 224/30 A
[58] Field of Search ............ 368/10, 69, 70, 107–113, 368/316–317; 224/30 R, 30 A, 32, 38, 36, 41

[56] References Cited

U.S. PATENT DOCUMENTS

| | | | |
|---|---|---|---|
| D. 278,210 | 6/1982 | Tsuyama | D10/46 |
| D. 287,946 | 4/1984 | Tsuyama | D10/98 |
| D. 288,542 | 4/1984 | Tsuyama | D10/98 |
| 503,058 | 8/1893 | McGriff | 224/41 |
| 2,588,671 | 3/1952 | Tringau | 224/30 R |
| 4,756,454 | 7/1988 | Villanueva et al. | 224/30 A |

*Primary Examiner*—Vit W. Miska
*Attorney, Agent, or Firm*—William C. Crutcher

[57] ABSTRACT

A bicycle handlebar holder for a wrist instrument with pushbuttons and electrical contact means, said holder having a holder body, a cover which is pivotable with respect to the body and defining therewith a receptacle for holding the case of said wrist instrument when the cover is closed, a clamp for attaching the body to a bicycle handlebar, a plurality of electrical contacts disposed in the body and opening into the receptacle, and at least one manual actuator disposed in the cover and adapted to be operated from outside of the cover and having a portion movable inside said receptacle which is disposed to depress a pushbutton when the actuator is operated.

7 Claims, 4 Drawing Sheets

BICYCLE HANDLEBAR HOLDER FOR A WRIST INSTRUMENT

BACKGROUND OF THE INVENTION

This invention relates generally to a device for temporarily attaching a wrist instrument to a bicycle, and more particularly to a bicycle handlebar attachment to hold a wristwatch, which is especially adapted to receive external electrical signals.

An improved Combination Wristwatch and Bicycle Computer is the subject of my co-pending application, Ser. No. 171,056, filed Mar. 21, 1988, assigned to the present assignee. In my co-pending application, a wristwatch is responsive to external signals from sensors on the bicycle. That application discloses a holder for attachment to the bicycle handlebar having a receptacle for holding the watch case and having windows to provide access to the push buttons. This application concerns an improved holder for a wrist instrument, which provides improved means for actuating the push buttons on the wrist instrument.

Accordingly, one object of the present invention is to provide an improved bicycle handlebar holder for a wrist instrument receiving external electrical signals.

Another object of the invention is to provide improvements in push buttons actuators in a bicycle handlebar holder for a wrist instrument.

DRAWINGS

The invention, both as to organization and method of practice, together with further objects and advantages thereof, will best be understood by reference to the following description, taken in connection with the accompanying drawings, in which:

FIG. 1 is a perspective view of my improved bicycle handlebar watch holder with the wristwatch in place, FIG. 2 is a plan view of a combination wristwatch and bicycle computer which is useful with the present invention, FIG. 3 is a perspective view of the watch holder with pivotable elements opened, FIG. 4 is an end elevation view, partly in section, of the holder, FIG. 5 is a side elevation, partly in section, of the holder with watch case in place, FIG. 6 is an enlarged side elevation of a portion of the cover and manual actuator, FIG. 7 is an end elevation view, partly in section of a modified holder clamp, and FIG. 8 is a perspective view of the modification of FIG. 7.

SUMMARY OF THE INVENTION

Briefly stated the invention comprises an improved bicycle handlebar holder for a wrist instrument with pushbuttons and electrical contact means, said holder having a holder body, a cover which is adapted to cooperate with the body and defining therewith a receptacle for holding the case of said wrist instrument when the cover is closed, a clamp for attaching the body to a bicycle handlebar, a plurality of electrical contacts disposed in the body and opening into the receptacle, and at least one manual actuator disposed in the cover and adapted to be operated from outside of the cover and having a portion movable inside said receptacle which is disposed to depress a pushbutton when the actuator is operated. Preferably the cover is pivotable with respect to said body.

DESCRIPTION OF THE PREFERRED EMBODIMENT

Figures 1, 2:
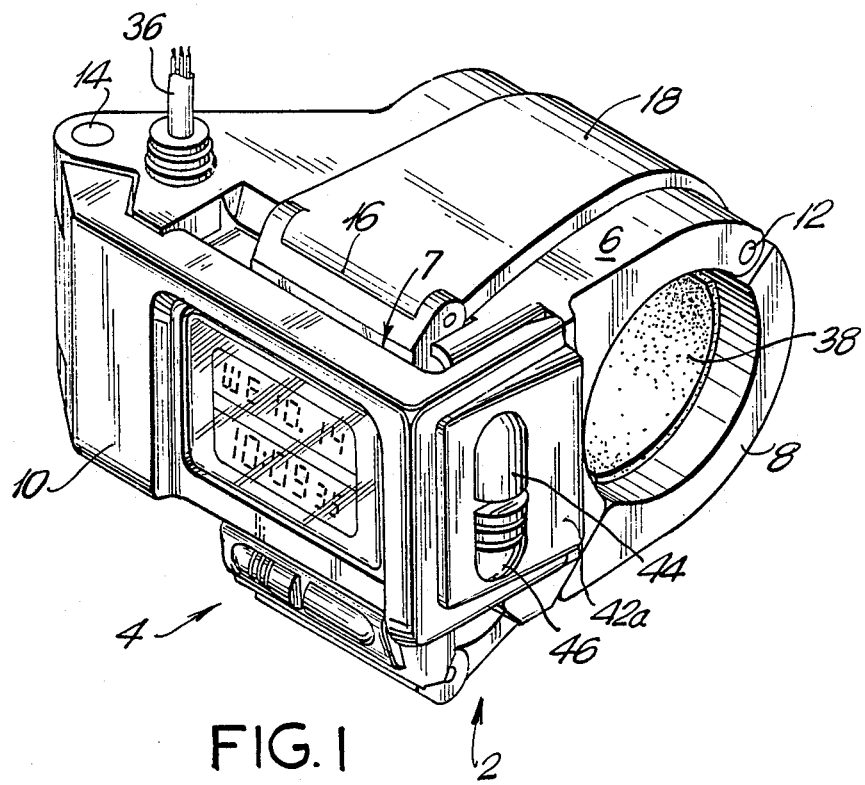

Referring to FIG. 1 of the drawing, a watch holder, shown generally as 2, is especially adapted to hold a wrist instrument, such as a combination wristwatch and bicycle computer, shown generally as 4. Holder 2 comprises three elements, a holder body 6, a holder clamp 8, and a holder cover 10. The holder clamp 8 is pivotable with respect to the holder body 6 by means of a pin 12, and the holder cover 10 is pivotable with respect to the holder body 6, by means of a pin 14. The cover 10 and body 6 define a receptacle 7 between them when the cover is closed in which is disposed a case 16 of wrist instrument 4. The wrist instrument 4 also includes a strap 18, preferably having a buckle or attachment by which it is secured around the body 6 of the holder.

Referring to FIG. 2 of the drawing, the case 16 of the wrist instrument has pushbuttons S1 on the left side, S2 and S3 on the right side and S4 and S5 on top. The case 16 further includes three electrical contact means to receive external signals. Two openings in a recess 20 in the side of the case provide access to two electrical contact terminals (see one such terminal 52 in FIG. 5) connected to the watch circuit. Preferably the watch case 16 is of plastic or insulating material and has a metal caseback, which serves as another or a third electrical contact means.

Figure 3:
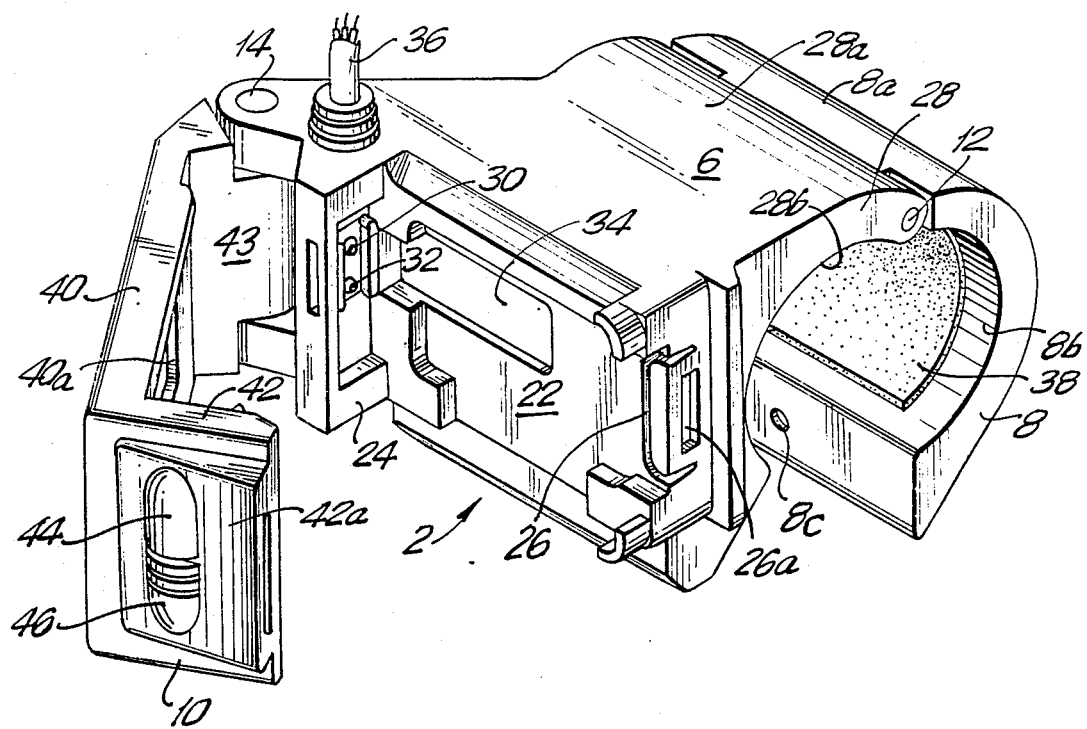

Referring to FIG. 3 of the drawing, the holder 2 is shown without the wristwatch, with the pivotable elements open in order to illustrate the internal construction. Body 6 includes a rectangular upper section defining a recess 22 and opposed end walls 24, 26 which form the lower part of the receptacle for the case of the wrist instrument. A curved body extension 28 has an external curved surface 28a for receiving the strap of the wrist instrument and a semi-cylindrical internal surface 28b designed to match a bicycle handlebar. Mounted on the end wall 24 opening into the receptacle are two electrical contact pins 30, 32 and along the bottom of recess 22 is a spring metal contact strip 34. Elements 30, 32, 34 are connected by wires to a cable 36 which leads to sensors for providing external signals, including switch closures.

Holder clamp 8 is pivoted open on a pin 12 and includes an external curved surface 8a and internal semi-cylindrical surface 8b. The latter may include a recess to hold a rubber pad 38. Clamp 8 is attached to body 6 by means of a screw attachment passing through a hole 8c.

Body cover 10 is shown pivoted open on a pin 14. It includes a rectangular top 40 and opposed end walls 42, 43, which define the other portion of the receptacle for the case of the wrist instrument. Top 40 has a window 40a for viewing the face of the wrist instrument. End wall 42 includes a handle projection 42a for opening the body cover 10 and supports a pair of manual actuators 44, 46. When cover 10 is closed, it is retained by a projection 42b (See FIG. 5) which snaps into a recess 26a on the end wall 26 of the holder body.

Figure 4:
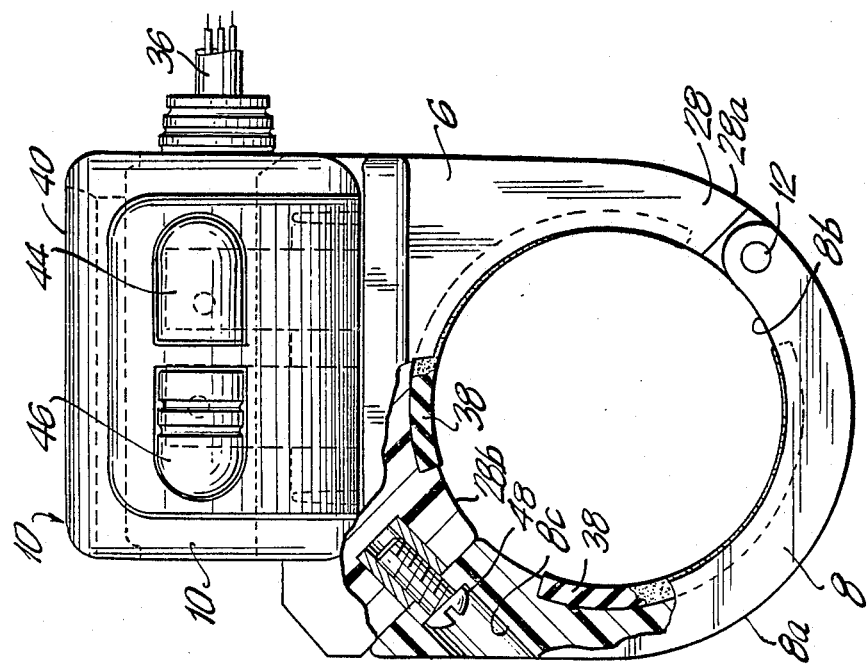

Referring to FIG. 4 of the drawing, clamp 8 is pivoted to a closed position as it would be attached around a bicycle handlebar and secured with a screw 48 passing through hole 8c. The surfaces of rubber pads 38 extend slightly above the semi-cylindrical surfaces 8b, 28b so as to grip the handlebar. The outer surfaces 8a, 28a of the clamp and holder provide a continuous curved surface for attachment of the wristwatch strap on the outside of the holder.

Figure 5:
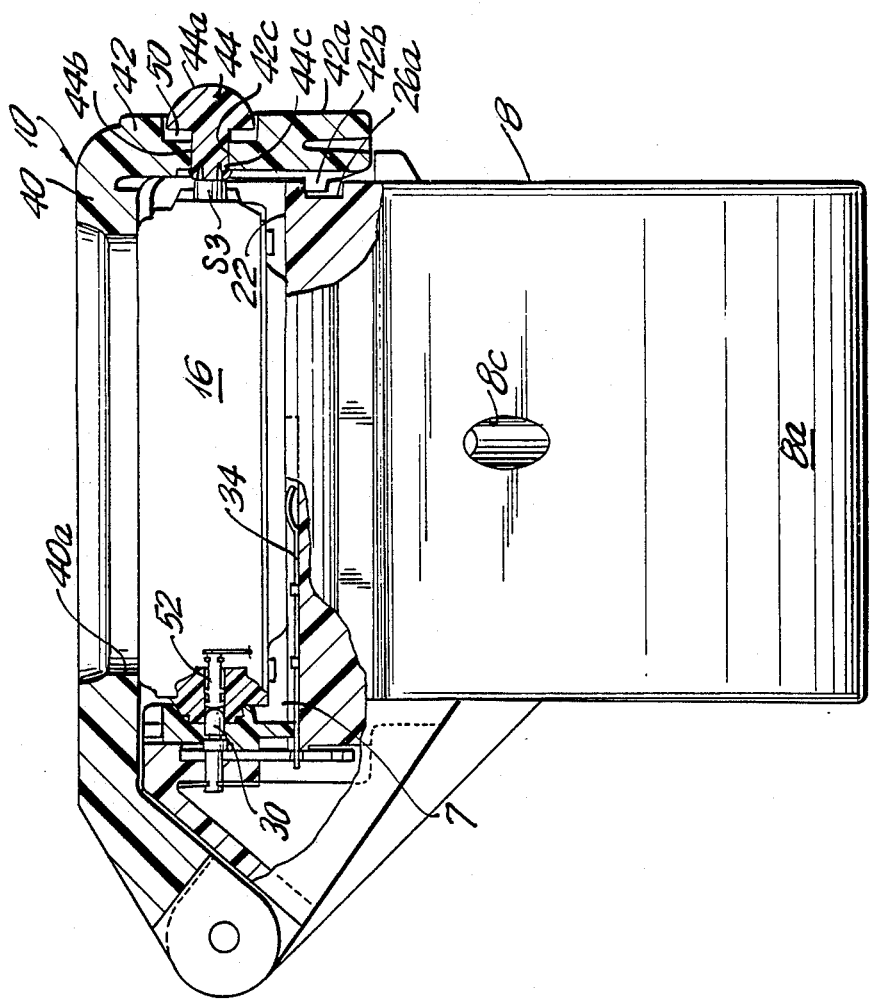
Figure 6:
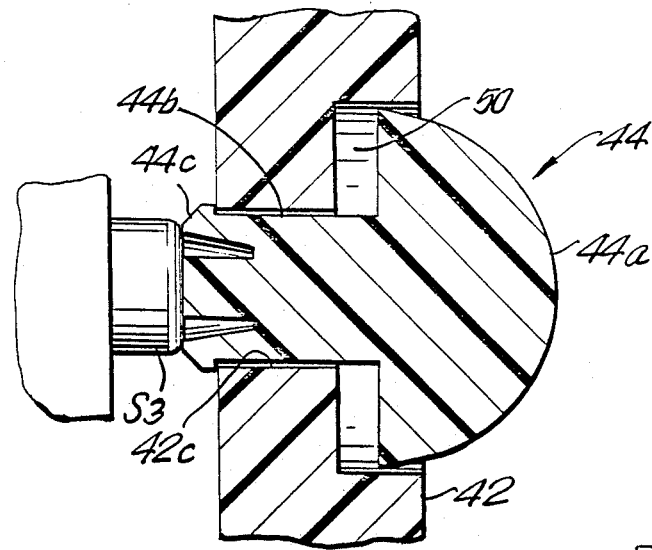

Referring to FIG. 5 of the drawing, the wrist instrument case 16 is shown in place for viewing its display through the window 40a in the cover 10. As shown in cross section, the end wall 42 of the cover is held in place by a projection 42b, which snaps into recess 26a on the body. End wall 42 has a pair of apertures (one of which is seen at 42c), which are aligned with watch push buttons, such as seen at S3, when the watch case is properly positioned in the receptacle. As shown more clearly in the enlarged view of FIG. 6, the actuators 44 have a rounded head 44a, and shank 44b which extends into the aperture. The end of the shank is split to provide retention prongs 44c. A clearance 50 allows the actuator 44 to be pushed by the head 44a from outside the cover, so that shank 44b pushes against the watch push button S3 inside the receptacle to operate the pushbutton from the outside of the holder. A similar arrangement is provided for the actuator 46 and the watch push button S2.

Electrical contact to the watch circuit is made by spring clip 34 against the metal caseback, and the metal contact pins such as 30 operating a spring loaded electrical contact pin 52 inside the watchcase. Other types of electrical connections are possible, the rigid holder pin 30 and the spring loaded watch pin 52 being shown for purpose of illustration.

Figure 7:
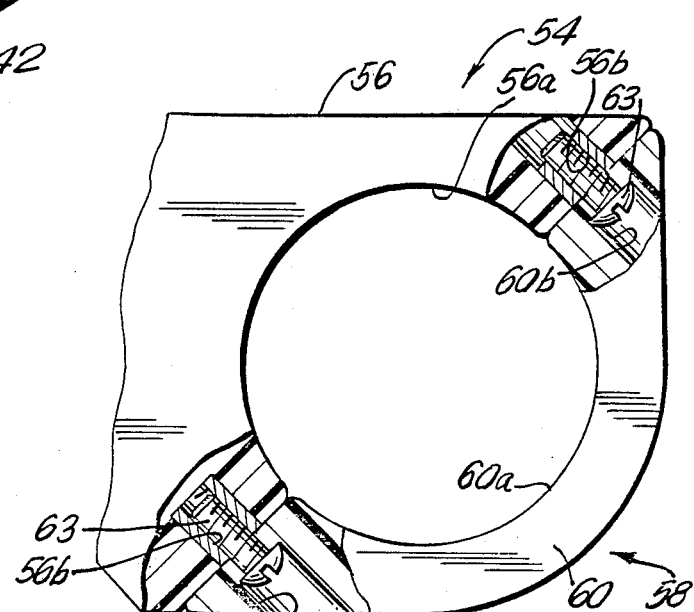
Figure 8:
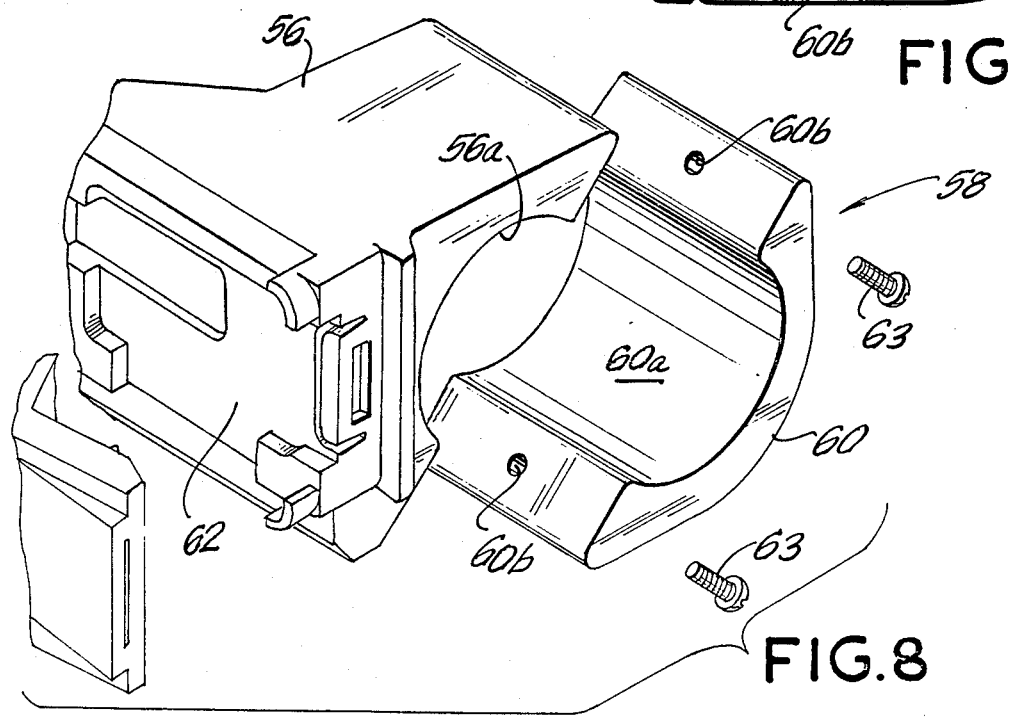

An alternate handlebar clamping means is shown in FIGS. 7 and 8. Rather than providing a pivotable clamp, the clamp is separate from the holder body, and separately attached.

Referring to FIGS. 7 and 8, the modified handlebar holder for a wrist instrument is shown generally at 54 and includes a holder body 56, a holder clamp 58 and a holder cover 60. The cover 60 and holder body 56 define a receptacle 62 between them. The holder and cover are as previously described, with manual actuator in the cover as before, and having the same reference numbers.

Clamp 60 has a semicylindrical internal surface 60a and holder body 56 has a similar matching semicylindrical internal surface 56a, which to correspond to the shape and size of a bicycle handlebar. The opposite terminating ends of clamp 60 are counterbored at 60b to receive screws 63 which, in turn, are received in threaded openings 56b. Tighter clamping and less expensive construction may be possible with the modified clamp, allowing the rubber pads 38 of FIGS. 1-5 to be eliminated.

While there has been described what is at present to be considered the preferred embodiment of the invention, other modifications will become apparent to those skilled in the art, and it is desired to secure in the appended claims all such modifications as fall within the true spirit and scope of the invention.

I claim:

1. An improved bicycle handlebar holder adapted to receive a wrist instrument having, a strap, a case with push buttons and electrical contact means to receive external electrical signals, said holder comprising:
    a holder body,
    a cover adapted to cooperate with said body and defining therewith a receptacle for receiving said case when the cover is closed,
    means for clamping said body to a bicycle handlebar,
    a plurality of electrical contact means disposed in said body and opening into said receptacle, and
    at least one manual actuator disposed in said cover and adapted to be operable from the exterior of the cover and having a portion movable inside said receptacle, which is adapted to depress one of said pushbuttons when the actuator is operated while said case is disposed in said receptacle when said cover is closed.

2. The combination according to claim 1, wherein said cover is pivotable with respect to said body, and having first means for securing it to said body to hold the case in said receptacle.

3. The combination according to claim 2, wherein said clamping means comprises a clamp which is pivotable with respect to said body, having second means for securing it to said body to hold the holder on a handlebar.

4. The combination according to claim 2, wherein said clamping means comprises a separate semicylindrical clamp, and having third means for securing it to said body to hold the holder on a handlebar.

5. The combination according to claim 2, wherein said holder body and said clamp together define a curved outer surface for receiving said strap of said wrist instrument.

6. The combination according to claim 1, wherein said cover defines an aperture, wherein said manual actuator comprises a head accessible from outside the cover, a shank slidably disposed in said aperture, and means for retaining the shank in said aperture.

7. The combination according to claim 1, wherein there are at least two of said manual actuators slidably disposed in said cover.

* * * * *